US006160228A

United States Patent [19]
Gerbert-Gaillard et al.

[11] Patent Number: 6,160,228
[45] Date of Patent: Dec. 12, 2000

[54] DEVICE FOR LOCKING A CIRCUIT BREAKER PLUG-IN AND DISCONNECTION MECHANISM

[75] Inventors: Alain Gerbert-Gaillard, Vourey; Michel Perroud, Gières, both of France

[73] Assignee: Schneider Electric SA, France

[21] Appl. No.: 09/219,430

[22] Filed: Dec. 23, 1998

[30] Foreign Application Priority Data

Jan. 15, 1998 [FR] France .................................. 98 00568

[51] Int. Cl.⁷ ................................................ H02B 1/04
[52] U.S. Cl. ........................................ 200/50.21; 361/609
[58] Field of Search .................. 200/50.01, 50.21–50.27, 200/43.04, 43.08, 43.14; 361/601, 605–610, 615–621, 724–727, 837

[56] References Cited

U.S. PATENT DOCUMENTS

| | | | |
|---|---|---|---|
| 2,885,502 | 5/1959 | Eichelberger et al. | 200/50 |
| 3,440,371 | 4/1969 | Netzel et al. | 200/50 |
| 3,783,209 | 1/1974 | Cleaveland et al. | 200/50 AA |
| 4,489,362 | 12/1984 | Castonguay et al. | 361/339 |
| 4,743,715 | 5/1988 | Gerbert-Gaillard et al. | 200/50 AA |
| 4,823,231 | 4/1989 | Jego et al. | 361/331 |
| 5,495,388 | 2/1996 | Bonetti et al. | 361/609 |

*Primary Examiner*—Michael Friedhofer
*Attorney, Agent, or Firm*—Parkhurst & Wendel, L.L.P.

[57] ABSTRACT

The locking device of a plug-in and disconnection mechanism for a circuit breaker comprising a kinematic transmission system driven by a removable crank comprises a main locking catch able to take a closed position in which it prevents the crank from being fitted and an open position in which it enables the crank to be fitted, at least one operating cam and lever mechanism designed to take information representative of one or more positions of the circuit breaker and to prevent passage of the mobile element of the main locking catch to its closed position when none of these positions is detected, and an operating mode selector. In the embodiment with one cam and lever mechanism, the selector enables the cam and lever mechanism to be activated or neutralized. In the embodiment with two cam and lever mechanisms, the selector enables one or the other of the two cam and lever mechanism to be selected.

10 Claims, 12 Drawing Sheets

DEVICE FOR LOCKING A CIRCUIT BREAKER PLUG-IN AND DISCONNECTION MECHANISM

BACKGROUND OF THE INVENTION

The invention relates to a plug-in and disconnection mechanism designed to be operated by an operating part, in particular a crank, for a switchgear apparatus with disconnection by extraction, in particular an extractable circuit breaker, and more particularly to its locking device.

The document EP-A-0,236,179 describes a reversible plug-in and disconnection mechanism designed to be operated by a crank, for an extractable circuit breaker comprising main circuits with disconnection by extraction and auxiliary circuits designed for electrical control of the switchgear apparatus, these auxiliary circuits having to be connected before plug-in of the main circuits. This mechanism comprises a kinematic transmission system designed to place the circuit breaker in a plurality of states, i.e.: a "plugged-in" state in which the main and auxiliary circuits of the circuit breaker are connected, an intermediate "test" state in which the main circuits are disconnected and the auxiliary circuits are connected, and a "disconnected" state in which the main and auxiliary circuits are disconnected. This kinematic transmission system comprises a rotary primary shaft one end of which comprises means for securing the crank. The mechanism moreover comprises a main locking catch able to take a closed position in which the catch prevents engagement of the crank on the primary shaft and an open position in which the catch engagement. The locking catch is biased to its closed position by a return spring and comprises a finger which operates in conjunction with a rod of a rotary indicator of the position of the mechanism. This rod comprises an indexing notch corresponding to the disconnected state of the circuit breaker. A control part of the locking catch is thus formed able to take information representative of one of the states of the kinematic transmission system and to oppose movement of the locking catch to its closed position when this state is not detected.

In practice, when the operator reaches the state thus indexed and removes the crank, the main locking catch takes its closed position and it becomes possible to use a secondary padlocking catch to lock the main locking catch and prevent the crank from being reinserted. The circuit breaker is blocked in the state defined by the position of the rotary indicator notch. If on the other hand the operator removes the crank whereas the mechanism has not reached the indexed position, the main locking catch remains in the open position and cannot be padlocked. According to the operator's wishes, a more or less large number of positions of the mechanism can be indexed by varying the number of notches of the rotary indicator. In practice, several types of behaviors are observed; some operators want to have the possibility of locking in one position only—in general the disconnected position-, others prefer locking in the three positions, disconnected, test and plugged-in, and still others require locking in all the possible positions of the mechanism, including the intermediate positions. The switchgear apparatuses are therefore equipped in the plant for one or another of the possibilities and the operating mode can then not be modified on site.

SUMMARY OF THE INVENTION

The first object of the invention is to enable the choice to be made on site between at least two operating modes for a switchgear apparatus, in reliable, simple and reversible manner, without adversely affecting the compactness of the plug-in mechanism.

This problem is solved according to the present invention by a locking device of a reversible plug-in and disconnection mechanism designed to be driven by a removable operating part for a switchgear apparatus with disconnection by extraction designed to be placed in several states, for example a state called "disconnected" and a state called "plugged-in". This device comprises: a main locking catch comprising a mobile element able to assume a position called "closed" in which the mobile element prevents the operating part from being fitted and a position called "open" in which the mobile element enables the operating part to be fitted; and a first operating means of the main locking catch to which one or more of said states of the switchgear apparatus are associated and able, when in an active state, to determine if the apparatus is not in one of said associated states and in this case to prevent the mobile element of the main locking catch from moving to its closed position; the first operating means of the main locking catch being designed to move in reversible manner from said active state to a passive state in which it cannot prevent the mobile part of the main locking catch from moving to a closed position, the device comprising in addition an operating mode selector comprising a selection part able to move reversibly from a first position and designed to maintain the first operating means in an active state throughout a plug-in and disconnection cycle, to a second position in which the selection part is designed to maintain the first operating means in a passive state throughout a plugin and disconnection cycle.

According to a particularly advantageous mode, the device comprises in addition a second operating means of the main locking catch, to which one or more of said states of the apparatus are associated, at least one of which differs from the states associated to the first operating means. This second operating means is able, when an active state, to determine if the apparatus is not in one of the states associated to this second operating means and in this case to prevent the mobile element of the main locking catch from moving to its closed position. In addition, the second operating means is designed to move in a reversible manner from said active state to a passive state in which it cannot prevent the mobile part of the main locking catch from moving to its closed position. The selection part of the operating mode selector in a first position is in addition designed to maintain the second operating means in a passive state throughout a plug-in and disconnection cycle, and in a second position is in addition designed to maintain the second operating means in a active state throughout a plug-in and disconnection cycle. This enables a choice to be made between two alternative indexed sequences. In practice, a single state of the apparatus, preferably the "disconnected" state, will be associated to the first operating means, whereas the three states—"plugged-in", "test" and "disconnected"—will be associated to the second operating means.

Advantageously, the first and second operating means of the main locking catch each comprise an indexing cam whose position is representative of the states of the circuit breaker and an associated element designed to take information representative of the state or states associated to the corresponding operating means from the corresponding cam. This cam may be rotary, notably in the case where it is fixed to an element of a kinematic transmission system. It can also be an appreciably straight slide with notches or protrusions, fixed to an element movable in translation with respect to the support of the main locking catch, whose movement is representative of the different states of the switchgear apparatus.

Particularly simple and precise operation is obtained when the selection part, both in its first position and in its second position, is securely affixed to the mobile element of the main locking catch and when the associated element of each of the first and second operating means is a lever comprising: a selection surface designed, in the active state of the corresponding operating means, to operate in conjunction with the selection part in such a way that movement of the mobile element of the main locking catch from an open position to a closed position drives the lever in pivoting; and a detection surface designed to operate in conjunction with the corresponding cam and to take therefrom said information representative of the state or states associated to the corresponding operating means.

Advantageously, for the purposes of simplicity of assembly and reduction of the number of parts, the levers have a common pivoting axis.

Particularly reliable operation is obtained when the operating mode selector comprises return means designed to return the first and second operating means to their passive state, the selection part being designed, in its first position, to maintain the first operating means in its active state against the action of the return means and, in a second position, to maintain the second operating means in its active state against the action of the return means. Advantageously, the return means bias the levers in rotation in a direction moving their detection surface away from the cam. These return means can comprise for example a spring for each lever, compressed between the lever and the mobile element of the main locking catch. According to another alternative embodiment comprising a single spring, this spring is compressed between the two levers and tends to move the latter away from one another.

Advantageously, the device comprises a secondary locking catch designed to take a locked position in which the secondary locking catch locks the main locking catch in a closed position and an unlocked position. In this case, the main locking catch, when in an open position, locks the secondary locking catch in an unlocked position. This secondary locking catch may be a padlocking catch comprising an eyelet designed to operate in conjunction with a padlock. Alternatively, it may be a secondary locking catch with a keylock, the main locking catch in the open position being designed to prevent insertion or rotation of the key in the keylock. Finally, the device may combine several secondary locking catches of the foregoing types.

Particularly simple operation is obtained when the mobile element of the main locking catch is biased to a closed position by a flexible return means and comprises a ramp designed to operate in conjunction with the operating part to move the mobile element to its open position against the action of the flexible return means. Movement of the mobile element of the main locking catch takes place from a open position to open closed position when a twofold condition is fulfilled: on the one hand the switchgear apparatus must be in one of the indexed states; and on the other hand the operating part must have been removed. Inversely, return of the mobile element to its open position takes place when, the secondary locking catch being unlocked, the operating part is fitted, which results in it cooperating with the ramp of the mobile element and movement of this element.

To increase the compactness and integration of the assembly, the device can be integrated in the reversible plug-in and disconnection mechanism which comprises in addition a kinematic transmission system designed to be driven by the operating part, to move the switchgear apparatus at least to said states, this kinematic transmission system comprising mechanical connection means designed to operate in conjunction with complementary means of the operating part so that the latter can be fitted and removed and, when is fitted, can drive the kinematic transmission system. The mobile element of the main locking catch in a closed position simply has to prevent access to the connection means and enable access thereto in the opposite case.

The invention applies in privileged manner to mechanisms whose kinematic transmission system is driven both between the disconnected state and the test state then between the test state and the plugged-in state. For this type of mechanism, three positions of the kinematic transmission system are conventionally defined, i.e. a "plugged-in" position corresponding to the plugged-in state of the switchgear apparatus, an intermediate "test" position corresponding to the testing state of the switchgear apparatus, and a "disconnected" state corresponding to the disconnected state of the switchgear apparatus. This category conventionally includes mobile circuit breakers on slides supported by a frame and moving uniformly in translation due to the effect of the kinematic transmission system driven by the crank between the disconnected position and the test position, then between the test position and the plugged-in position. It also includes circuit breakers of the type described in the document EP-A-0,236,179 already referred to, for which plug-in and disconnection of the auxiliary circuits are performed by means of the kinematic transmission system actuated by the crank, but without causing movement of the body of the circuit breaker with respect to the frame. The invention is also applicable to the simplest apparatuses for which the kinematic transmission system enables the circuit breaker to be switched between the two "test" and "plugged-in" states and is uncoupled between the "disconnected" position and the "test" position, movement of the circuit breaker being achieved by simply pushing on the body thereof. A system of this kind is for example described in the document U.S. Pat. No. 4,020,301.

To achieve precision of positioning of the elements of the mechanism and compactness of the assembly, it is advantageous to provide a common support for these elements. Thus the kinematic transmission system preferably comprises a primary shaft guided in rotation and fixed in translation with respect to a support, one of the ends of this primary shaft comprising the means for mechanical connection to the crank, the mobile part of the main locking catch being guided with respect to the support and the levers having their pivoting spindle fixed to the support. The support can be fixed with respect to the switchgear frame, as described in EP-A-0,236,179, with respect to the body of the switchgear or with respect to an intermediate element secured for example to one of the plug-in slides, as is described in the document U.S. Pat. No. 4,020,301.

To avoid problems of breakage without having to oversize the parts of the mechanism, it is advantageous that each of the cams be secured to an element of the kinematic transmission system, in particular to an element other than the primary shaft. This arrangement is particularly advantageous when a torque limiting device is inserted in the kinematic transmission system at the level of the primary shaft. In this case, this downstream location of the primary shaft prevents a too large torque applied to the primary shaft from being transmitted to the parts of the mechanism according to the invention, which prevents any risk of damage.

BRIEF DESCRIPTION OF THE DRAWINGS

Other advantages and features of the invention will become more clearly apparent from the following description of different embodiments of the invention given as non-restrictive examples only and represented in the accompanying drawings in which.

DETAILED DESCRIPTION OF THE PREFERRED EMBODIMENT

Figure 1:
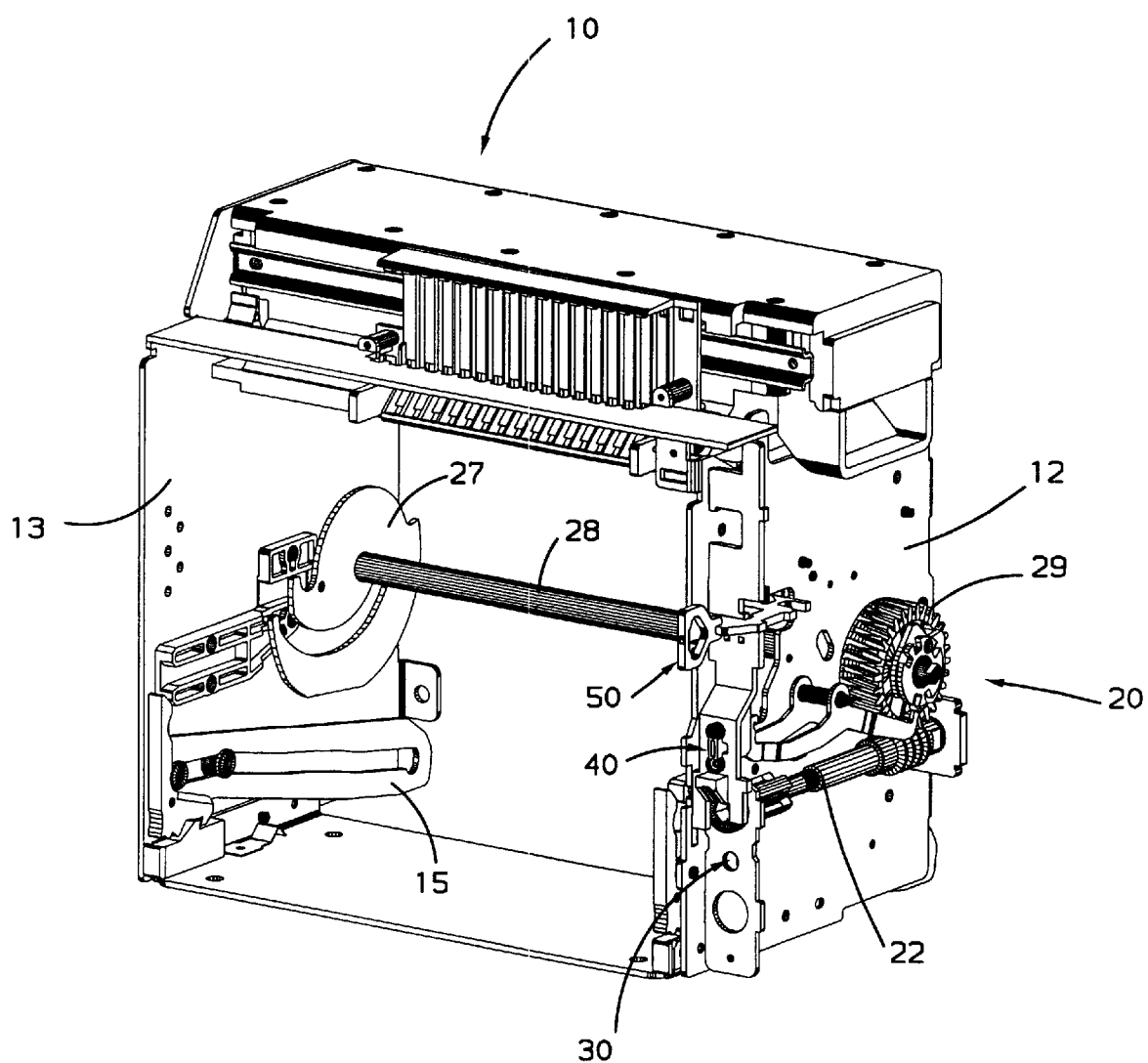
FIG. 1 represents a perspective view of the fixed frame of a plug-in circuit breaker, equipped with a device according to a first embodiment of the invention.

A part of a frame 10 forming the fixed part of a circuit breaker onto which a mobile part (not represented) bearing switching mechanisms engages by an essentially axial movement has been represented in FIG. 1. This fixed frame comprises two side walls 12, 13 which support in rotation a plug-in shaft 28 provided with two cams 27 each designed to operate in conjunction with coupling elements of the mobile part of the circuit breaker to perform conversion of the rotary movement of the plug-in shaft into an essentially translational movement of the mobile part of the circuit breaker with respect to the frame in the plug-in axis which is perpendicular to the axis of the shaft 28. The man of the trade will also recognize in FIG. 1 the plug-in slides 15 acting as supports for the mobile part of the circuit breaker.

Figure 2:
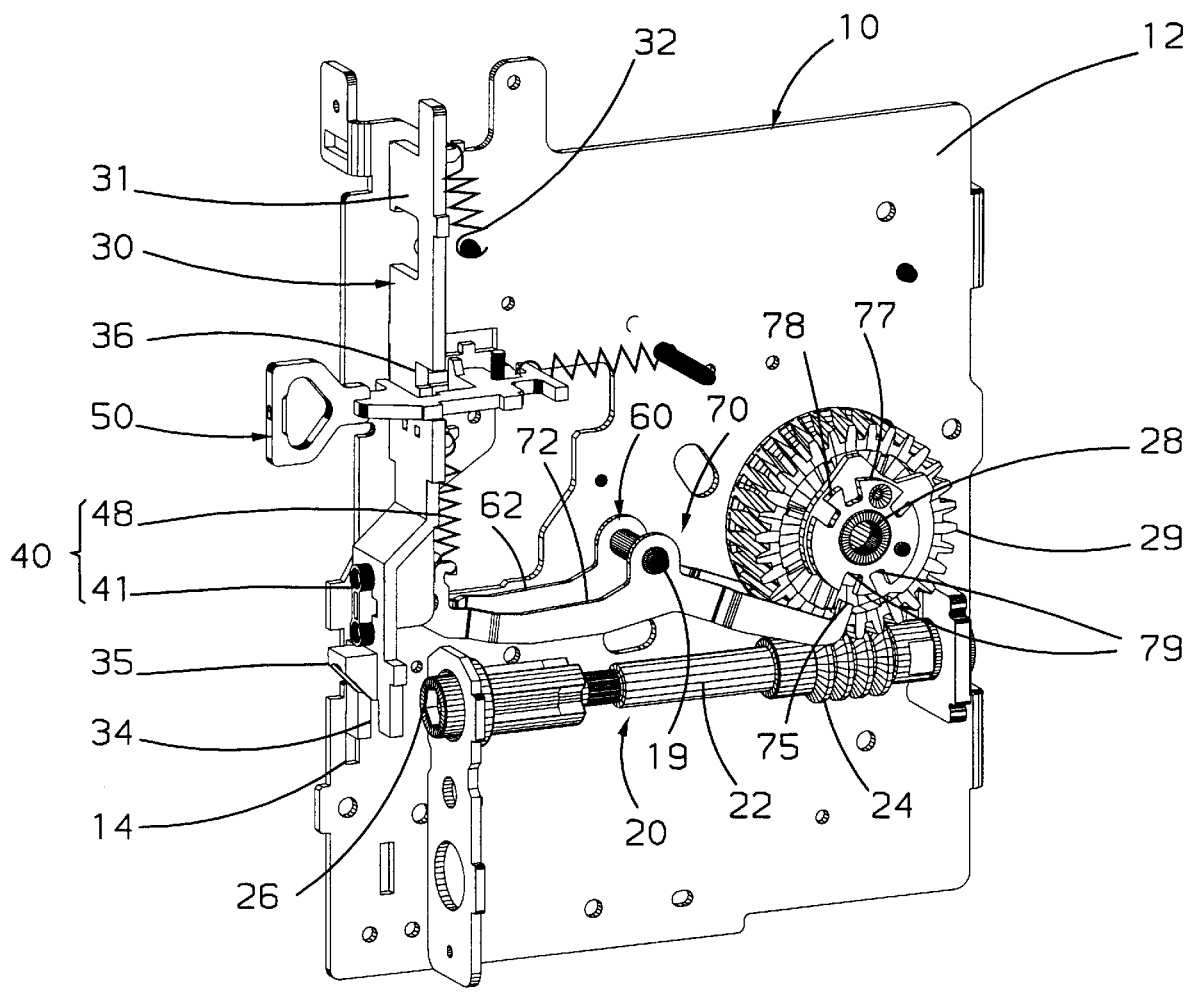
FIG. 2 represents a perspective view of the device on its support.

FIG. 2 shows more particularly the side wall 12 of the frame 10 which constitutes a support element of the device of the invention. Plug-in and disconnection of the circuit breaker are achieved by means of a kinematic transmission system 20 comprising a primary shaft 22 guided in rotation around its axis with respect to the wall 12, the transverse plug-in shaft 28 and an endless screw mechanism whose thread 24 is securedly united to the primary shaft 22 and whose cog-wheel 29 is securedly united to the plug-in shaft 28. The primary shaft 22 comprises at one of its ends a blind hole 26 of polygonal cross-sectional designed to operate in conjunction with a removable operating part, in the present case a crank 100. A front cover plate 16 (cf. FIG. 3a) of the frame 10 comprises an orifice 18 with a cylindrical wall in the axis of the primary shaft 22, facing the blind hole 26.

The plug-in mechanism comprises in addition a main locking catch 30 with a slide 31 which slides in translation in the guiding grooves 14 of the wall 12 of the frame 10. The locking catch is represented in FIG. 1 in its open (up) position which enables the crank to be inserted via a passage 34 in the form of a notch of the slide 31 into the blind hole 26 of the primary shaft 22. The upper part of the wall incorporating the passage 34 is extended by a ramp 35.

Figure 4:
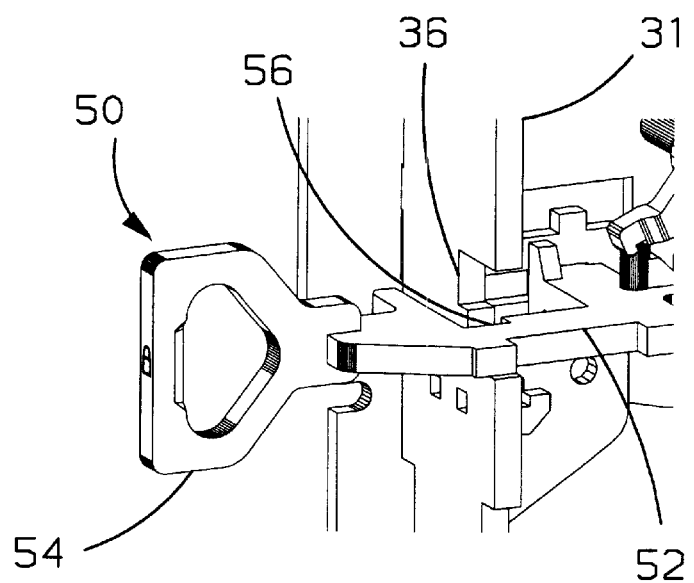
FIG. 4 is a perspective view showing cooperation of the main locking catch in the open position with the padlocking catch.
Figure 5:
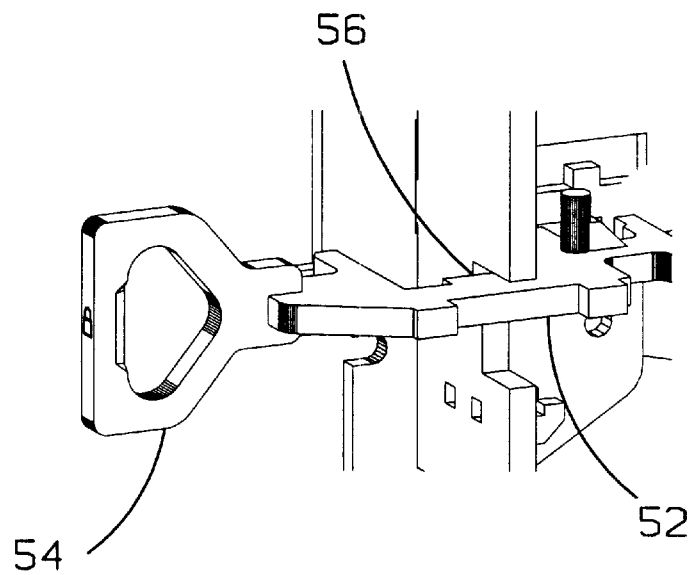
FIG. 5 is a perspective view showing cooperation of the main locking catch in the closed position with the padlocking catch.

The main locking catch 30 is in addition provided with an orifice 36 whose walls operate in conjunction with a notch 56 (FIG. 4) of the rod 52 of a secondary padlocking catch 50. In the open position of the main locking catch, represented in FIGS. 2, 3a and 4, this cooperation prevents the padlocking catch from being extracted, whereas in the closed position of the main locking catch, represented in FIGS. 3 and 5, this extraction is possible. The padlocking catch 50 is provided with an eyelet 54 acting as gripping part enabling its extraction. In the extracted position, the eyelet is designed to operate in conjunction with a conventional padlock (not represented). The main locking catch is biased to its closed position by a spring 32 fixed to the side wall 12.

Figure 6:
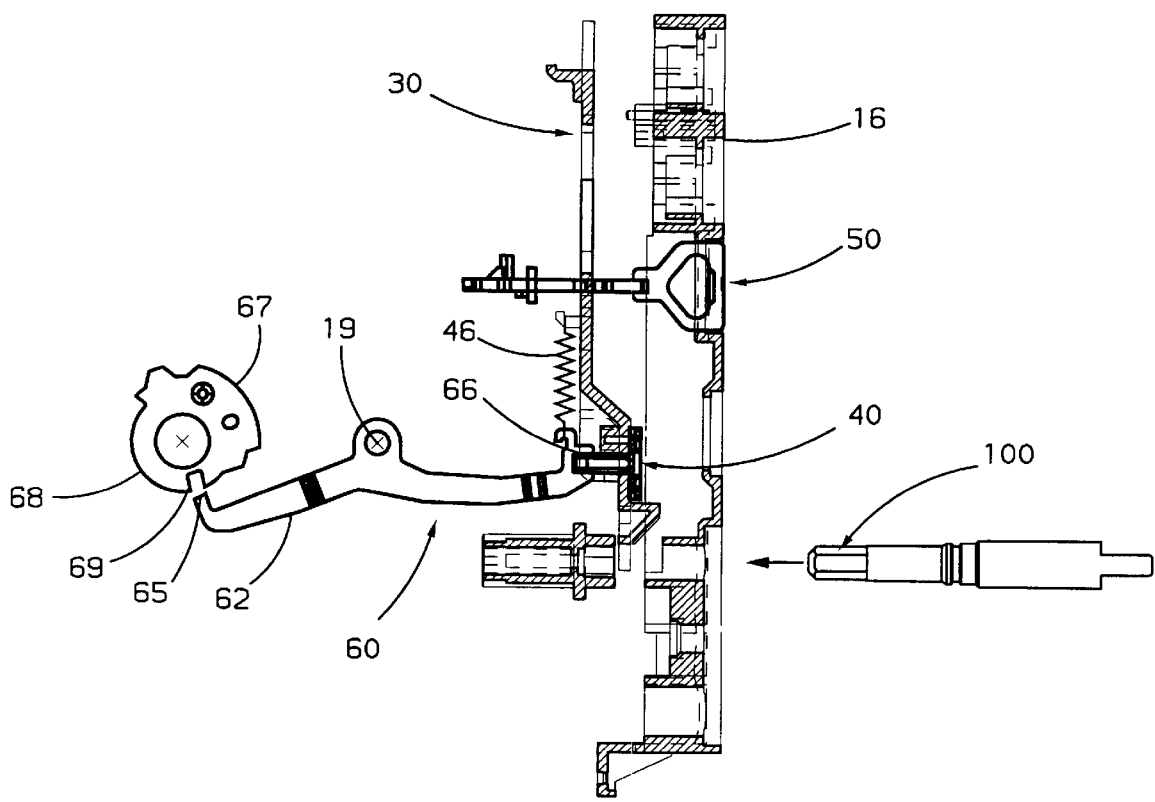
FIG. 6 is a cross-sectional view showing the main locking catch in the open position and the first operating means in its active state, cooperating with the selector.

The mechanism moreover comprises a first operating system 60 represented in FIG. 6 and comprising a lever 62 pivoting around a spindle 19 supported by the wall 12. One of the arms of the lever 62 has an end shaped as a hook defining a detection surface 65 designed to operate in conjunction with the side wall 68 of a cam 67 in the form of a disk provided with a radial notch 69. The indexing cam 67 is securedly united to the plug-in shaft 28. Its position is therefore representative of the position of the plug-in mechanism and consequently of the state of the circuit breaker. The notch 69 corresponds to an indexed position of the plug-in mechanism, i.e. the "disconnected" position. The other arm of the lever 62 comprises a slide 66 defining a surface for cooperation with an operating mode selector 40 securedly united to the slide 31 of the main locking catch 30. The lever 62 thus forms a mobile follower element taking from the cam 67 information representative of the position of the plug-in mechanism.

Figure 3A:
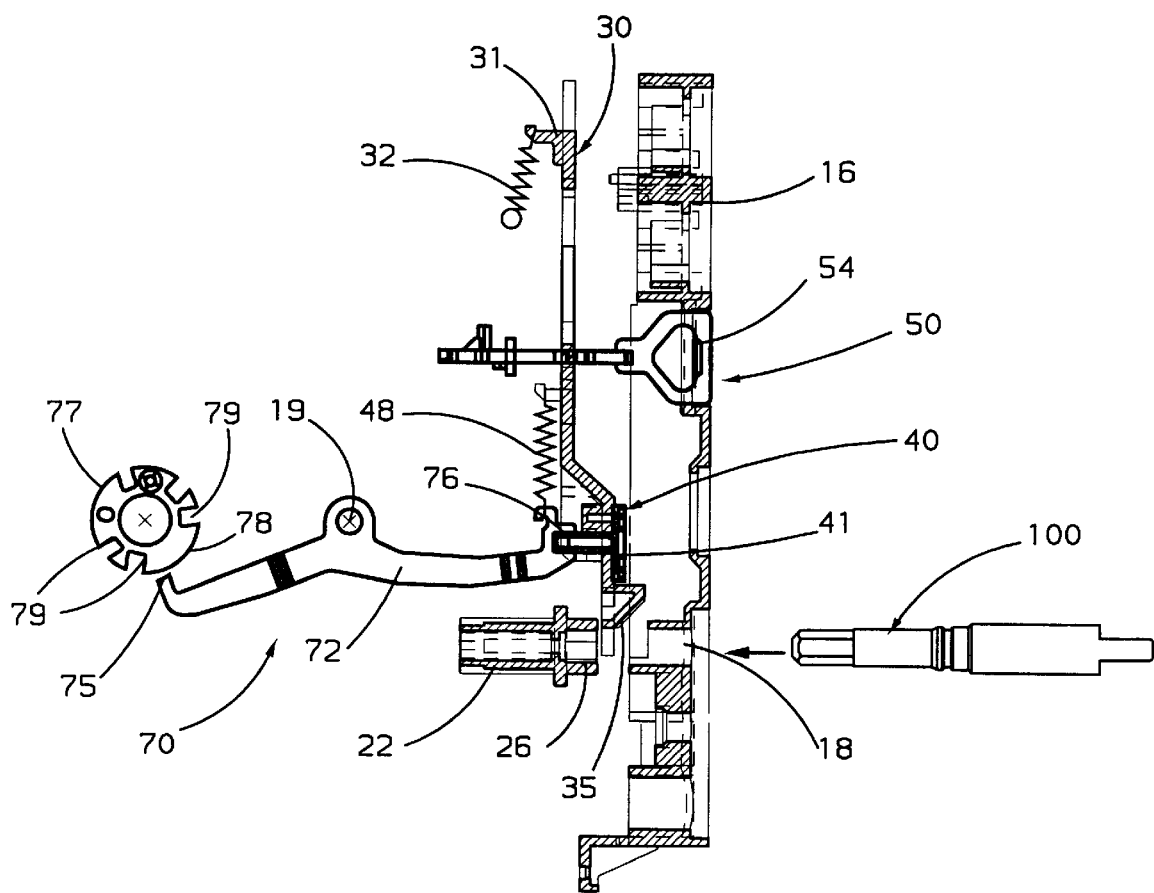
FIG. 3a represents a cross-sectional view showing the main locking catch in the open (up) position and the second operating means in its active state, cooperating with the selector.
Figure 3B:
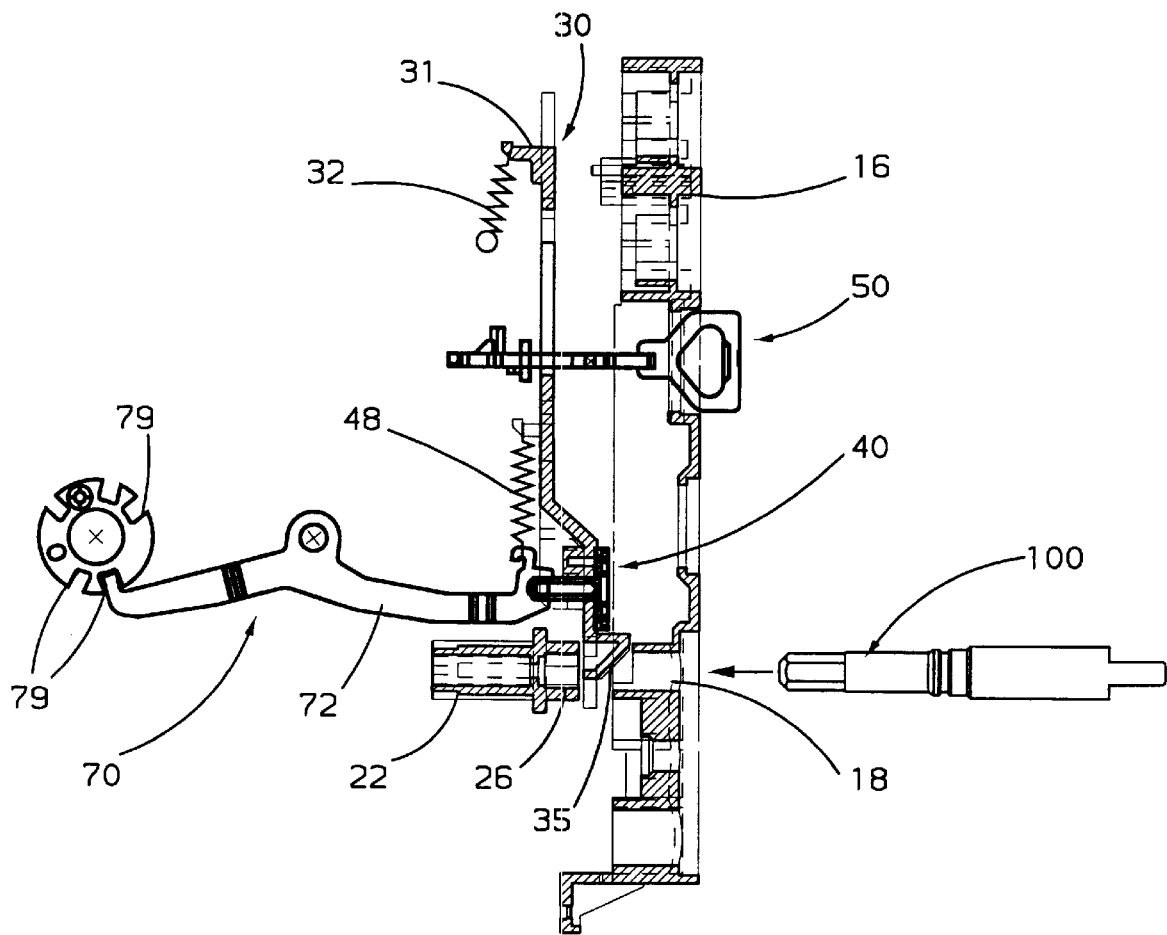
FIG. 3b is a cross-sectional view showing the main locking catch in the closed (down) position and the lever of the second operating means in its active state, cooperating with the selector and with a notched disk.

The mechanism also comprises a second operating system 70 represented in FIGS. 3a and 3b, comprising a lever 72 similar to the lever 62 and pivoting around the spindle 19. One of the arms of the lever 72 has an end shaped as a hook, defining a detection surface 75 designed to operate in conjunction with the side wall 78 of an indexing cam 77 in the form of a disk provided with three radial notches 79. The disk 77 is securedly united to the plug-in shaft and has a position representative of the position of the plug-in mechanism and consequently of the state of the circuit breaker. The notches 79 each correspond to an indexed position of the plug-in mechanism, i.e.: the "plugged-in" position, the "test" position and the "disconnected" position. The other arm of the lever 72 comprises a slide 76 defining a surface for cooperation with the operating mode selector 40 securedly united to the slide 31 of the main locking catch 30. The lever 72 comprises a mobile follower element taking from the cam 77 information representative of the position of the plug-in mechanism.

Figure 7:
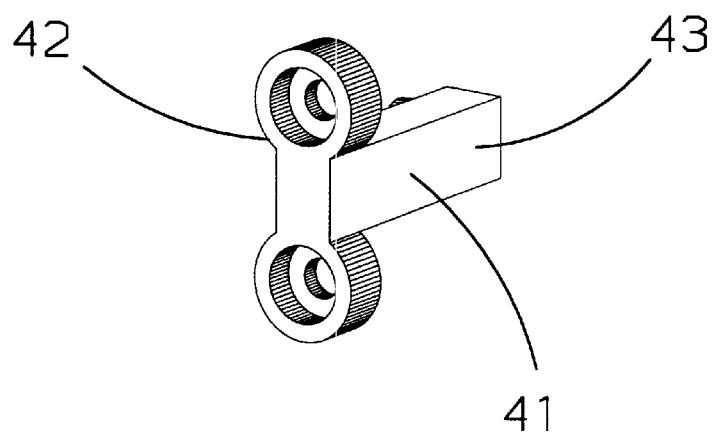
FIGS. 7a and 7b are two perspective views of the selection part of the selector.
Figure 7:
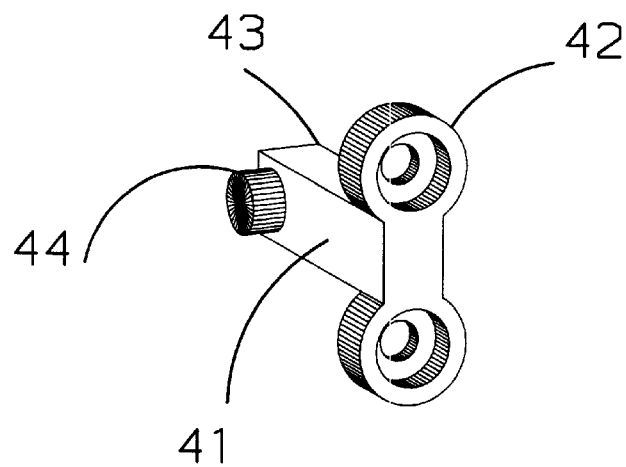
Figure 8A:
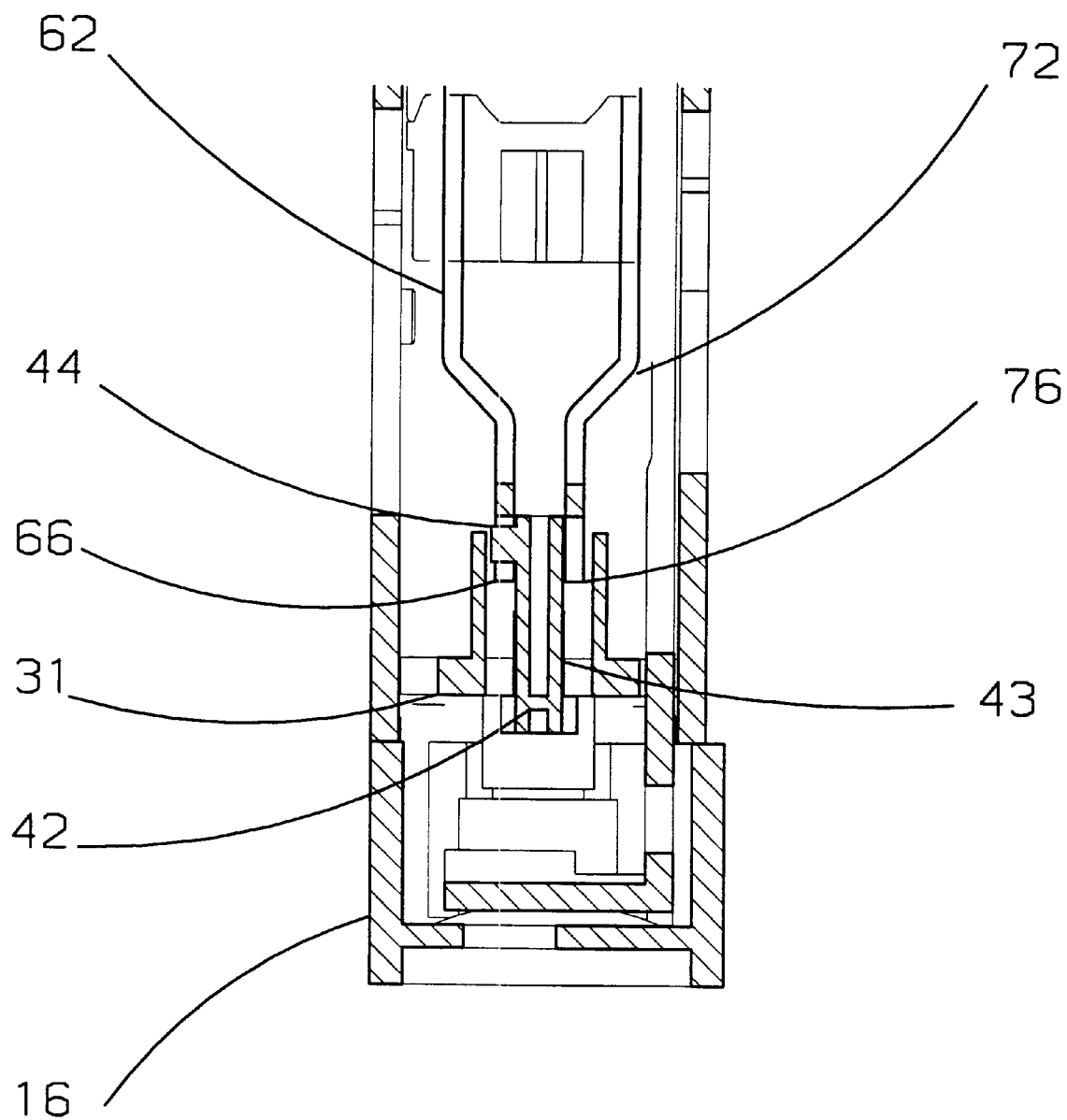
FIGS. 8a and 8b are two cross-sectional views in a plane containing the axis of the body of the selection part and the axis of the cylinder of the selection part, showing cooperation of the selection part with one and with the other of the levers.
Figure 8:
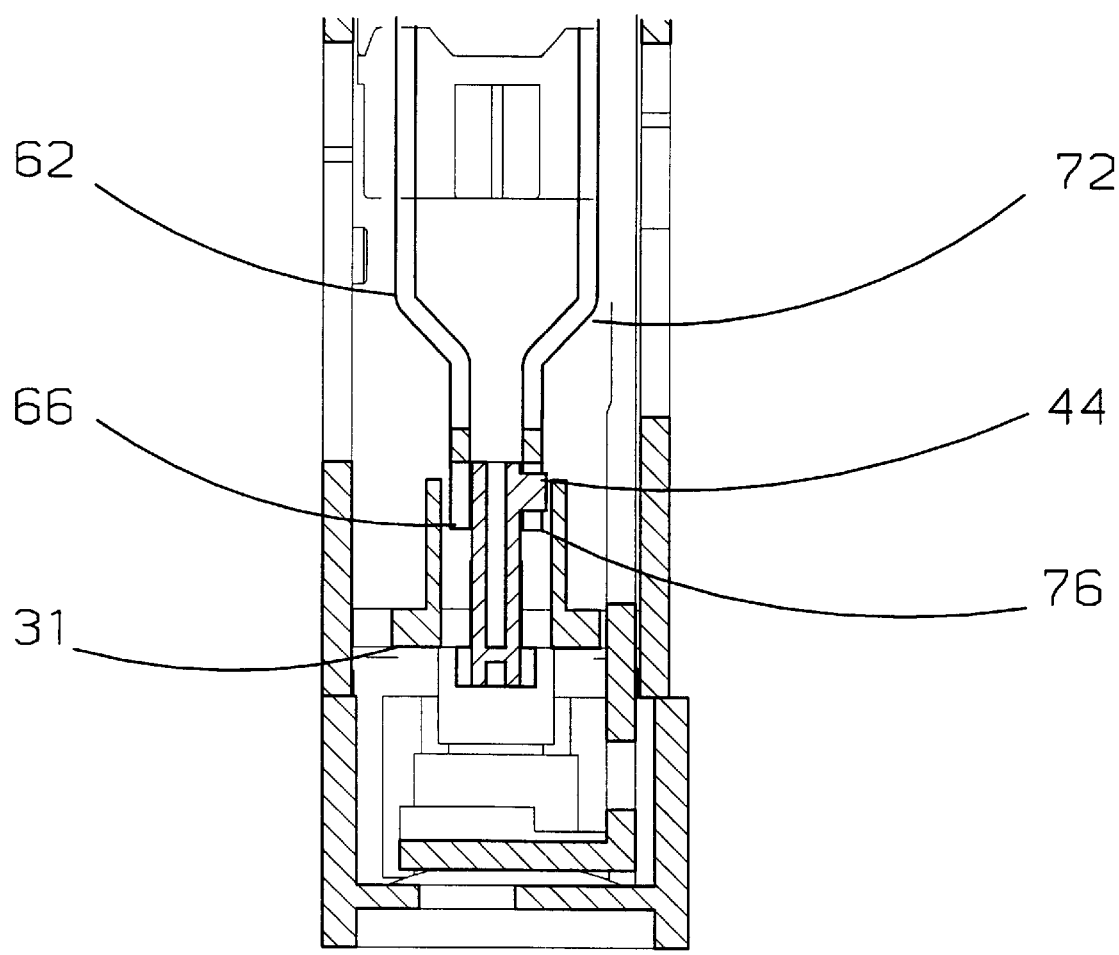

The operating mode selector 40 referred to above comprises a selection part 41 represented in FIGS. 7a and 7b. This involves a T-shaped part comprising a head 42 and a body 43 whose end comprises a cylinder 44. The straight cross section of the head 42 in a plane perpendicular to the axis of the body 43 is symmetrical with respect to the plane defined by the axis of the body 43 and the axis of the cylinder 44. It is also symmetrical with respect to the plane containing the axis of the body 43 and perpendicular to the foregoing plane. The slide 31 of the main locking catch 30 comprises a receiving recess of complementary shape to that of the head 42 of the selector 40, opening out between the two levers 62 and 72. The selector can therefore be inserted in the receiving recess in either of two positions, i.e.: a position represented in FIG. 8a in which the cylinder 44 is pointing towards the lever 62 and operates in conjunction with its slide 66 and a position represented in FIG. 8b in which the cylinder 44 is pointing towards the lever 72 and operates in conjunction with its slide 76.

The selector 40 also comprises a return spring 46 (FIG. 6) fixed between the lever 62 and slide 31 and a return spring 48 (FIGS. 2, 3a and 3b) fixed between the lever 72 and slide 31, each of these springs biasing the corresponding lever in rotation so as to separate the hook of the lever and the associated cam from one another.

The mechanism operates in the following manner:

To choose an operating mode when the circuit breaker is in the disconnected position, the operator removes the front cover plate 16 and accesses the front face of the slide 31. He can then insert the selector 40 in the required position—for example and for the purposes of the explanation in the position of FIG. 8b—so that one of the levers—in this case the lever 72—operates in conjunction with the selector 40 and is in its state called active. The hook 75 of the lever 72 is disposed inside the notch 79 corresponding to the disconnected position. As for the lever 62, it is in a state called passive. By this we mean that it does not operate in conjunction with the selector 40. It is simply biased by the return spring 46 so as to separate its detection surface 65 from the cam 67 (clockwise in FIG. 2). The front cover plate 16 then has to be repositioned.

In this configuration, at rest, the slide is biased to its closed position by the spring 32. The passage 34 is therefore not aligned with the orifice 18 of the front cover plate and blind hole 26 of the primary shaft 22. When the crank is inserted in the orifice 18, the cylindrical walls of this orifice perform guiding of the crank in translation. The crank operates in conjunction with the ramp 35 and its insertion causes the slide to be raised to its open position enabling alignment of the passage 34 in the axis of the primary shaft 22 and of the orifice 18, and pivoting of the lever 72 in the direction which causes disengagement of the hook 75. The lever 62 for its part remains free. The crank can therefore be inserted in the blind hole 26, which enables it to be secured in rotation with the primary shaft 22. The presence of the crank prevents the slide 31 from redescending.

Rotation of the crank causes movement of the mechanism to its test position and the corresponding change of state of the circuit breaker.

If the crank is removed whereas the mechanism is in an intermediate position between the disconnected position and the test position, the action of the spring 48 is counteracted by the hook 75 which operates in conjunction with the wall 78 outside the notches 79. The main locking catch remains in the open position, preventing access to the padlocking catch 50. The operator then knows that he cannot lock the mechanism and that he cannot perform operations on the circuit breaker.

On reaching the test position, the mechanism actuates a blocking system, not represented. In this position, the hook 75 is located facing the notch 79 corresponding to the test position. The lever 72 is therefore free to pivot in the closing direction of the slide. This slide however remains practically in position so long as it is pressing against the crank. If the crank is removed, the spring 32 makes the slide 31 descend and causes counterclockwise rotation of the lever 72, the hook 75 entering into the corresponding notch. The operator who wants to work on the circuit breaker will be able to extract the eyelet 54 of the padlocking catch 50, insert a conventional padlock (not represented) therein and thus perform padlocking of the slide 31 in the closed position, preventing the crank from being inserted. The circuit breaker is thus locked in the test position, even if the operator releases the blocking system (not represented). It is only after the padlock has been removed and the padlocking catch 50 retracted that the crank 100 will be able to be inserted again. Alternatively to the padlocking catch 50, the operator can also with the same effect use a keylock (not represented) operating in conjunction with the slide 31.

Operation is identical in an intermediate position between the test position and the plugged-in position, and then on reaching the plugged-in position. It is also identical when progressive extraction is performed from the plugged-in position to the test position and then to the disconnected position. Finally, it is directly transposable in the case where the selection part 41 is disposed in such a way as to operate in conjunction with the lever 62 of the first operating means 60. It will be understood that the number of notches presented in this embodiment is not restrictive. The man of the trade will be able to vary both the location of the notches, i.e. the choice of the indexed states of the circuit breaker, and the number of notches, and therefore the number of indexed states.

Figure 9:
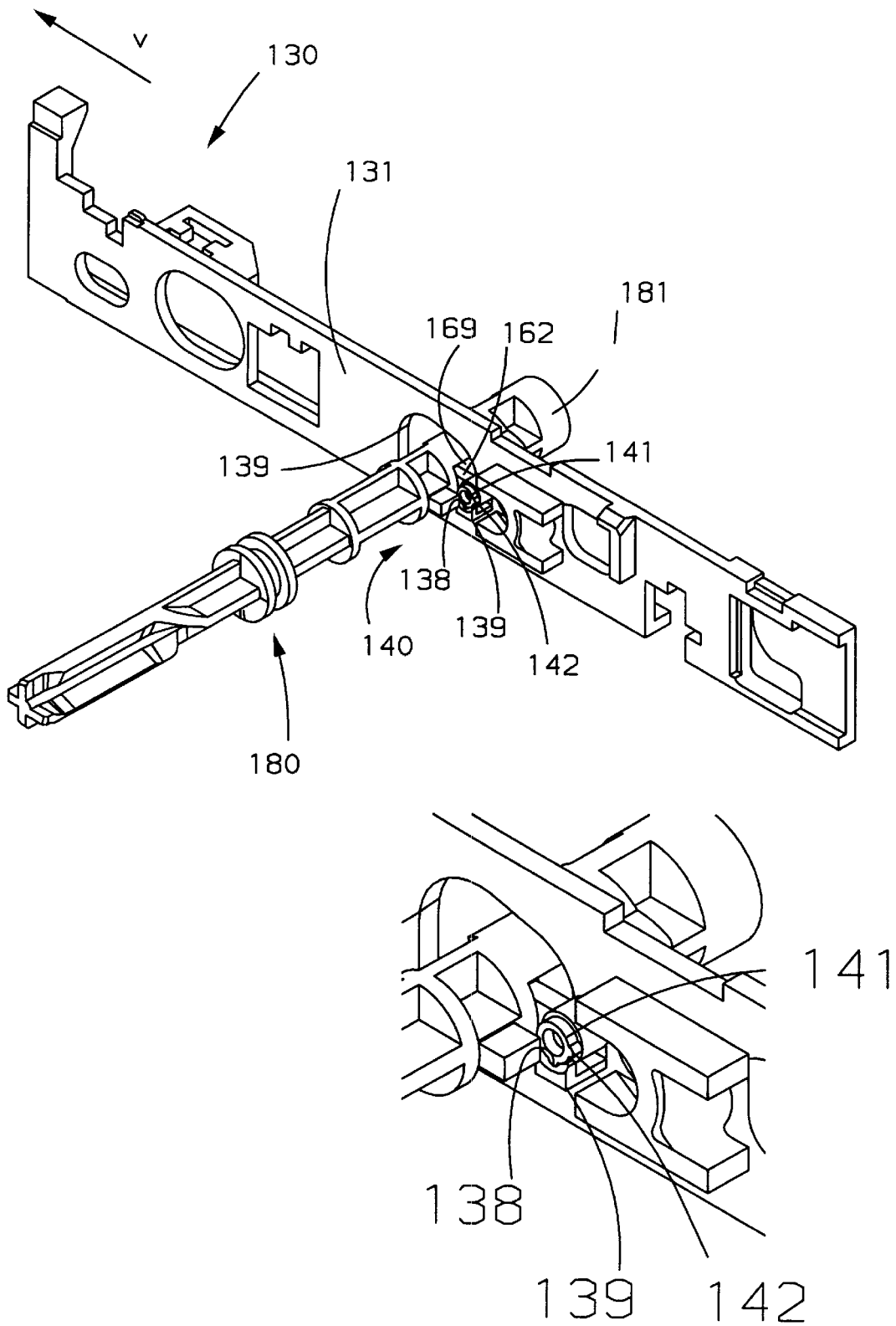
FIG. 9 is a perspective view of a second embodiment of the invention, in the active position of the operating mode selector.
Figure 10:
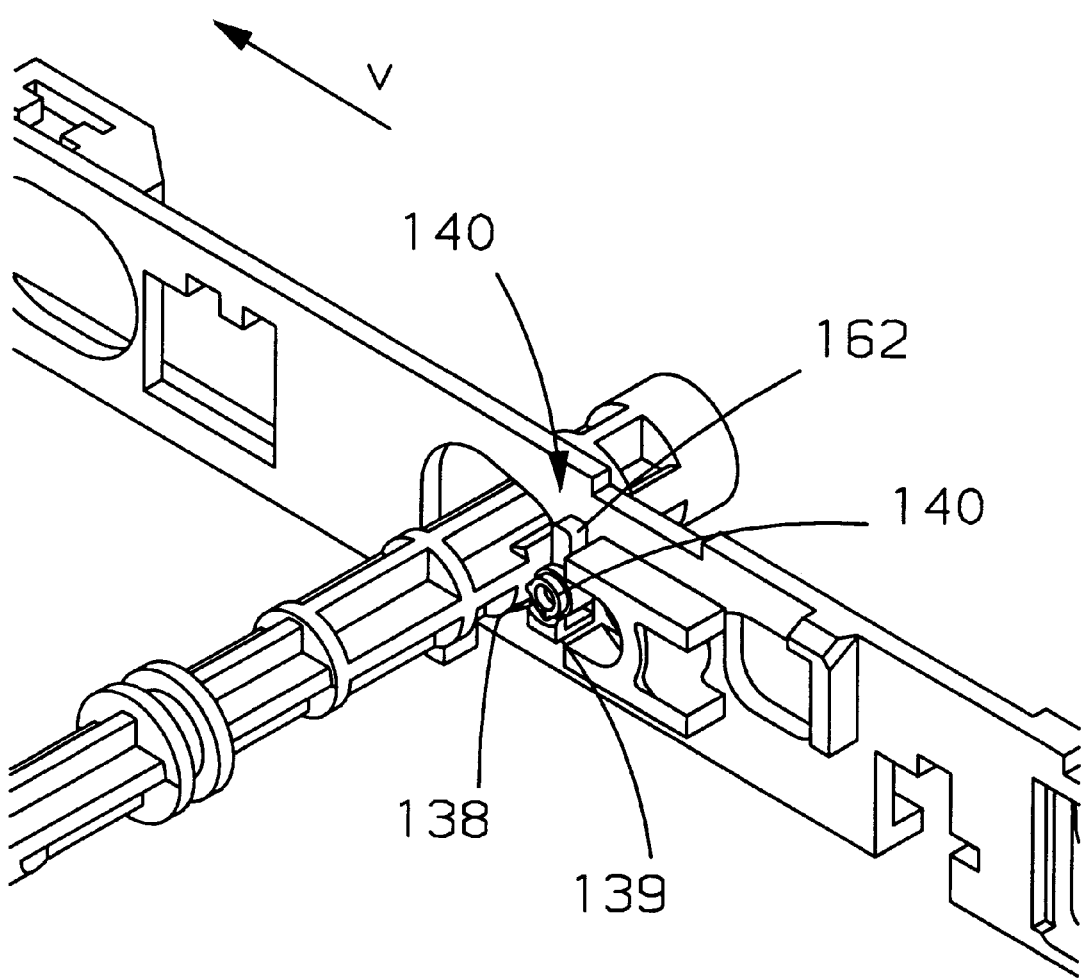
FIG. 10 is a perspective view of the second embodiment of the invention, in the passive position of the operating mode selector.

FIGS. 9 and 10 represent a second embodiment of the invention. In a similar manner to the previous embodiment, the mobile element 131 of the main locking catch 130 slides to block off the access of the crank (not represented). It is furthermore, in a similar manner to the previous embodiment, still biased by a spring to its closed position in the direction of the arrow V. The mobile element 131 supports in rotation the spindle 141 of a position selector 140. This spindle 141 comprises two protrusions 142 placed 90° from one another, which can in turn cooperate with a groove 138 borne by a lug 139 of the mobile element 131 of the main locking catch 130. When one of the protrusions 142 is engaged with the groove 138, the spindle 141 is fixed in rotation in the corresponding position.

The device further comprises a circuit breaker state indicator 180, which comprises a rotary rod 181. In a similar way to the device described in EP-A-0,236,179, whose description of the indicating device is included herein by reference, this rod is driven in rotation by an element securedly united to one of the elements of the kinematic transmission system designed to move the circuit breaker to its different states. Its angular position is characteristic of a position of the kinematic transmission system, and therefore of a state of the circuit breaker. The rod 181 passes through the main locking catch at the level of a hole of more or less oblong shape, enabling the catch to slide freely between its locking position and its unlocking position, without coming into premature contact with the rod 181.

The spindle 141 is securedly united to a stop 162 in the form of a lever, which can therefore be fixed in two positions with respect to the catch, represented respectively in FIGS. 9 and 10. In the position represented in FIG. 9, called the active position, the free end of the stop 162 is pointing towards the rotary rod 181 of the position indicator 180. The peripheral surface of the rod 181 comprises two cylindrical sectors on each side of a notch 169.

The device operates in the following manner:

The operator chooses to set the operating mode selector to one of its two positions. To do this he simply has to exert a force on the stop 162 forming a lever. The lug 139 is flexibly deformed and allows rotation of the spindle 141 followed by the protrusions 142 successively clipping into and unclipping out of the groove 138.

If the operator has chosen to set the stop to its active position (FIG. 9), the operation is the following. When the switchgear is not in its disconnected position, the notch 169 is not located facing the free end of the stop 162. Consequently, the stop 162 comes up against the cylindrical peripheral surface of the rod 181. Translation of the mobile element 131 of the locking catch 130 in the locking direction is thus disabled: the main locking catch remains in the open position. When the switchgear apparatus reaches the disconnected position, the notch 169 is aligned with the free end of the stop 162. If the crank is then removed, the mobile element 131, subjected to the bias of the return spring of the locking catch 130, slides in the direction of the arrow V until it reaches its closed position. The stop 162 is then located in the notch 169. The main locking catch can then be locked in position by means of a secondary catch, in a similar manner to the previous embodiment.

If on the other hand the operator has chosen to set the stop to its passive position (FIG. 10), the mobile element 131 is free to slide in the direction of the arrow V until the edge of the orifice 139 comes up against the stop formed by the rod 181, as soon as the crank has been removed. The main locking catch can thus be locked in the closed position by means of the secondary locking catch, in any intermediate state of the circuit breaker.

Thus, in this embodiment, the operating mode selector 140 comprises the spindle 141, the protrusions 142, and the groove 138 of the lug 139. The operating means 160 for its part comprises the stop 162 and the part of the rod 181 which is designed to operate in conjunction with the stop 162.

It is naturally possible to modify this device in such a way that the second position of the operating mode selector also corresponds to indexed locking positions and not to an infinity of locking positions. For this a second stop simply has to be provided, securely united to the selector spindle and disposed axially at a distance from the first stop and radially at a sufficient angle, for example 90°, so that when the spindle is turned so that the second stop is pointing towards the rod, a protrusion of the selector spindle comes into cooperation with the notch of the lug of the mobile element of the locking catch. The spindle of the position indicator also has to be shaped in such a way that this second stop is able to operate in conjunction with a second series of indexing notches made in the cylindrical peripheral surface of the spindle of the position indicator.

Figure 11:
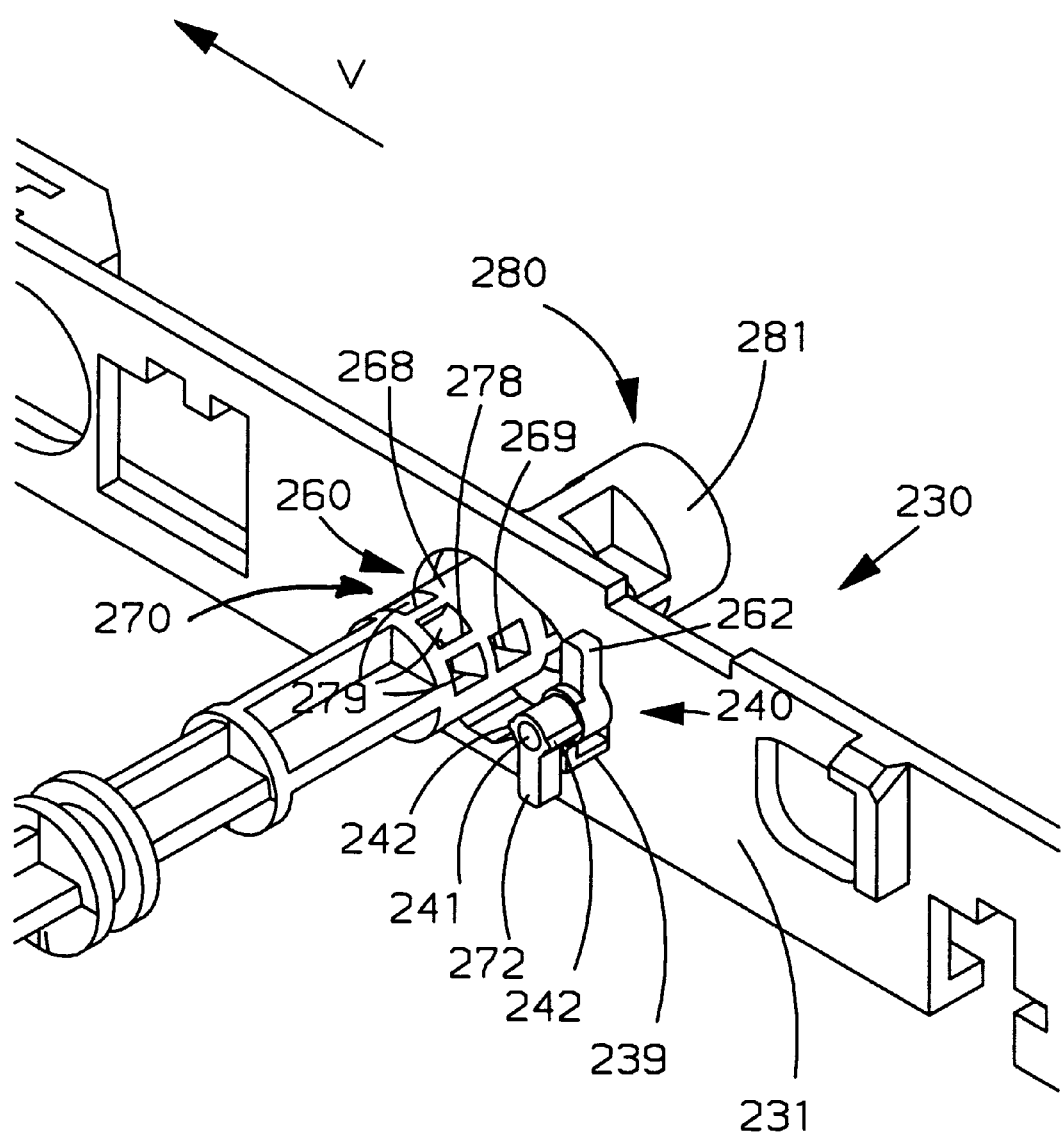
FIG. 11 is a perspective view of a third embodiment of the invention, in the passive position of the operating mode selector.

The three operating modes can also be cumulated, as shown by the embodiment of FIG. 11. The rod 281 of a switchgear status indicator 280 has been represented. This rod comprises a first cam comprising a side wall 268 provided with a single notch 269, and a second cam comprising a cylindrical side wall 278 provided with three notches 279. The operating mode selector 240 comprises a rotary spindle 241 supported by a slide 231 of a main locking catch 230, this spindle 241 being provided with protrusions 242, three in number, placed 90° from one another, two of which can be seen in FIG. 11. The spindle 261 is securely united to two stops located 180° from one another: the stop 262 designed to operate in conjunction with the cam formed by the surface 268 and the notch 269 and forming with this cam the first operating means 260, and the stop 272 designed to operate in conjunction with the cam formed by the surface 278 and the notches 279 and forming with this cam the second operating means 270. The spindle 241 can take three indexed positions by cooperation of the protrusions 242 with a lug 239 of the slide 231, bearing a groove similar to the groove 138: a first position in which the stop 262 is pointing towards the rod 281; a second intermediate position represented in the figure, in which none of the stops interfere with the rod 281; and a position in which the stop 272 is pointing towards the rod 281. For the rest, the operation of this embodiment is the same as that of the mode of FIGS. 9 and 10. In the embodiments described, the part on which the information representative of the switchgear state is taken is a rotary part. This facilitates matters, in particular when this information is taken from the kinematic plug-in system. It can however be envisaged to take this information from a part movable in translation. This solution becomes worthwhile notably when the device disabling access to the crank is located on the mobile part of the switchgear apparatus, as described for example in the document U.S. Pat. No. 5,337,210, which enables a plunger rod to be provided which comes up against a counterstop of the frame and whose translation is representative of the translation of the mobile part of the switchgear apparatus in the frame.

What is claimed is:

1. A locking device of a reversible plug-in and disconnection mechanism designed to be driven by a removable operating part, for a switchgear apparatus with disconnection by extraction designed to be placed in several states, the device comprising:

a main locking catch comprising a mobile element able to assume a closed position for preventing the operating part from being fitted and an open position for enabling the operating part to be fitted;

a first operating means for operating said main locking catch and to which one or more of said states of the switchgear apparatus are associated, said first operating means capable of assuming a state in which the first operating means determines if the apparatus is not in one of said associated states and in which the first operating means prevents the mobile element of the main locking catch from moving to its closed position when the apparatus is not in one of said states, wherein the first operating means may move in reversible manner from its active state to a passive state in which the first operative means cannot prevent the main locking catch mobile part from moving to its closed position; and an operating mode selector comprising a selection part able to move reversibly from a first position in which the selection part maintains the first operating means in its active state throughout a plug-in and disconnection cycle, to a second position in which the selection part maintains the first operating means in its passive state throughout the plug-in and disconnection cycle.

2. The device according to claim 1, further comprising:

a second operating means for operating said main locking catch and to which one or more of said states of the apparatus are associated, at least one of the states associated with the second operating means differing from the states associated with the first operating means, said second operating means being able to be in an active state in which the second operating means determines if the apparatus is not in one of the states associated with the second operating means and in which the second operating means prevents the main locking catch mobile element from moving to its closed position when the apparatus is not in one of the states associated with the second operating means, the second operating means designed to move in a reversible manner from its active state to a passive state in which the second operating means cannot prevent the mobile part of the main locking catch from moving to its closed position;

wherein the operating mode selector selection part in its first position maintains the second operation means in its passive state throughout the plug-in and disconnection cycle and, in its second position, maintains the second operating means in its active state throughout the plug-in and disconnection cycle.

3. The device according to claim 2, wherein the first operating means comprises a first indexing cam whose position is representative of the states of the switchgear apparatus; and a first associated element designed to receive information representative of the state or states associated to the first operating means from the first indexing cam; and the second operating means comprises a second indexing cam whose position is representative of the states of the switchgear apparatus, and a second associated element designed to receive information representative of the state or states associated to the second operating means from the second indexing cam.

4. The device according to claim 3, wherein the selection part, both in its first position and in its second position, is securedly affixed to the mobile element of the main locking catch, the first associated element is a first lever having a first pivot axis and comprises a first cooperation surface designed, in the active state of the corresponding first operating means, to operate in conjunction with the selection part in such a way that the first lever pivots when the mobile element moves from its open position to its closed position, and a first detection surface designed to operate in conjunction with the first indexing cam and to receive therefrom said information representative of the state or states associated with the first operating means; and the second associated element is a second lever having a second pivot axis and comprises a second cooperation surface designed, in the active state of the second operating means, to operate in conjunction with the selection part in such a way that the second lever pivots when the mobile element moves from its open position to its closed position, and a detection surface designed to operate in conjunction with the indexing cam and to receive therefrom said information representative of the state or states associated to the operating means.

5. The device according to claim 2, wherein the operating mode selector comprises return means designed to bias each of the first and second operating means to its passive state, the selection part being designed, in its first position, to maintain the first operating means in its active state against the bias of the return means and, in a second position, to maintain the second operating means in its active state against the bias of the return means.

6. The device according to claim 1, comprising at least one secondary locking catch designed to take a locked position in which it locks the main locking catch in its closed position and an unlocked position, and wherein the main locking catch, when it is in its open position, locks the secondary locking catch in its unlocked position.

7. The device according to claim 1, wherein the mobile element of the main locking catch is biased to its closed position by a flexible return means and comprises a ramp designed to operate in conjunction with the operating part so as to move the mobile element to its open position against the bias of the flexible return means.

8. A reversible plug-in and disconnection mechanism designed to be driven by a removable operating part, for a switchgear apparatus with disconnection by extraction designed to be placed in several states, the mechanism comprising:

a locking device of a reversible plug-in and disconnection mechanism designed to be driven by a removable operating part, for a switchgear apparatus with disconnection by extraction designed to be placed in several states, the device comprises a main locking catch comprising a mobile element able to take a closed position in which the mobile element prevents the operating part from being fitted and an open position in which the mobile element enables the operating part to be fitted, a first operating means for operating said main locking catch and to which one or more of said states of the switchgear apparatus are associated, said first operating means capable of assuming a state in which the first operating means determines if the apparatus is not in one of said associated states and in which the first operating means prevents the mobile element of the main locking catch from moving to its closed position when the apparatus is not in one of said states, wherein the first operating means is designed to move in reversible manner from an active state to a passive state in which the first operative means cannot prevent the main locking catch mobile part from moving to its closed position, and an operating mode selector comprising a selection part able to move reversibly from a first position in which the selection part maintains the first operating means in its active state throughout a plug-in and disconnection cycle, to a second position in which the selection part maintains the first operating means in its passive state throughout the plug-in and disconnection cycle; and a kinematic transmission system able to be driven by the operating part and thus move the switchgear apparatus to said states, the kinematic transmission system comprising mechanical connection means operable in conjunction with complementary means of the operating part so that the operating part can be fitted and removed and, when it is fitted, can drive the kinematic transmission system;

wherein the mobile element of the main locking catch in its closed position prevents access to the connection means, whereas in its open position it enables access to the connection means.

9. A reversible plug-in and disconnection mechanism designed to be driven by a removable operating part, for a switchgear apparatus with disconnection by extraction designed to be placed in several states comprising:

a locking device of a reversible plug-in and disconnection mechanism designed to be driven by a removable operating part, for a switchgear apparatus with disconnection by extraction designed to be placed in several states, the device comprises a main locking catch comprising a mobile element able to assume a closed position for preventing the operating part from being fitted and an open position for enabling the operating part to be fitted, a first operating means comprises a first indexing cam whose position is representative of the states of the switchgear apparatus, a first associated element designed to receive information representative of the state or states associated to the first operating means from the first indexing cam, the first associated element comprises a first lever having a first pivot axis, a first cooperation surface designed, in the active state of the corresponding first operating means, to operate in conjunction with the selection part in such a way that the first lever pivots when the mobile element moves from its open position to its closed position, and a first detection surface designed to operate in conjunction with the first indexing cam and to receive therefrom said information representative of the state or states associated to the first operating means, said first operating means for operating said main locking catch and to which one or more of said states of the switchgear apparatus are associated, said first operating means capable of assuming an active position in which the first operating means determines if the apparatus is not in one of said associated states and in which the first operating means prevents the mobile element of the main locking catch from moving to its closed position when the apparatus is not in one of said states, wherein the first operating means may move in reversible manner from an active state to a passive state in which the first operative means cannot prevent the main locking catch mobile part from moving to its closed position, and an operating mode selector comprising a selection part able to move reversibly from a first position in which the selection part maintains the first operating means in its active state throughout a plug-in and disconnection cycle, to a second position in which the selection part maintains the first operating means in its passive state throughout the plug-in and disconnection cycle, the selection part when in its first position and in its second position, being securedly affixed to the mobile element of the main locking catch;

a second operating means comprises a second indexing cam whose position is representative of the states of the switchgear apparatus, and a second associated element designed to receive information representative of the state or states associated to the second operating means from the second indexing cam, the second associated element comprises a second lever having a second pivot axis, a second cooperation surface designed, in the active state of the second operating means, to operate in conjunction with the selection part in such a way that the second lever pivots when the mobile element moves from its open position to its closed position, and a detection surface designed to operate in conjunction with the indexing cam and to receive therefrom said information representative of the state or states associated to the operating means, said second operating means for operating said main locking catch and to which one or more of said states of the apparatus are associated, at least one of the states associated with the second operating means differing from the states associated with the first operating means, said second operating means being able to be in an active state in which the second operating means determines if the apparatus is not in one of the states associated with the second operating means and in which the second operating means Prevents the main locking catch mobile element from moving to its closed position when the apparatus is not in one of the states associated to the second operating means, the second operating means designed to move in a reversible manner from its active state to a passive state in which the second operating means cannot prevent the mobile part of the main locking catch from moving to its closed position, wherein the operating mode selector selection part in its first position maintains the second operation means in its passive state throughout the plug-in and disconnection cycle and, in its second position, maintains the second operating means in its active state throughout the plug-in and disconnection cycle;

a kinematic transmission system able to be driven by the operating part for moving the switchgear apparatus to said states, the kinematic transmission system comprises mechanical connection means designed to operate in conjunction with complementary means of the operating part so that the operating part can be fitted and removed and, when it is fitted, can drive the kinematic transmission system, wherein the mobile element of the main locking catch in its closed position prevents access to the connection means, whereas in its open position it enables access to the connection means, a primary shaft guided in rotation and fixed in translation with respect to a support, the primary shaft having two ends, one of which comprises said mechanical connection means, wherein the mobile element of the main locking catch is guided with respect to said support and the levers have their pivoting axis fixed to said support.

10. The mechanism according to claim 9, wherein the kinematic transmission comprises a secondary shaft, and the first and second cams are secured to the secondary shaft.

* * * * *